United States Patent
Aizawa

(10) Patent No.: US 6,443,541 B1
(45) Date of Patent: Sep. 3, 2002

(54) BRAKING CONTROL APPARATUS AND METHOD FOR VEHICLES

(75) Inventor: Hideyuki Aizawa, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/718,487

(22) Filed: Nov. 24, 2000

(30) Foreign Application Priority Data

Dec. 16, 1999 (JP) ............................................ 11-357764

(51) Int. Cl.⁷ ................................................. B60T 8/28
(52) U.S. Cl. ...................................... 303/186; 303/173
(58) Field of Search ................................ 303/152–193

(56) References Cited

U.S. PATENT DOCUMENTS

| | | | | |
|---|---|---|---|---|
| 5,496,099 A | * | 3/1996 | Resch ....................... | 303/114.1 |
| 5,620,240 A | | 4/1997 | Tuck et al. | |
| 5,632,535 A | * | 5/1997 | Luckevich et al. ......... | 303/186 |
| 5,646,849 A | | 7/1997 | Walenty et al. | |
| 5,676,435 A | | 10/1997 | Breitenbacher et al. | |
| 5,826,954 A | | 10/1998 | Schmitt et al. | |
| 5,842,755 A | | 12/1998 | Sugimoto et al. | |
| 5,860,710 A | * | 1/1999 | Takemasa .................... | 303/190 |
| 5,887,957 A | * | 3/1999 | Buttner et al. .............. | 303/186 |
| 5,938,299 A | | 8/1999 | Hara et al. | |
| 5,975,650 A | | 11/1999 | Meier et al. | |
| 6,062,660 A | * | 5/2000 | Matsuno et al. ............. | 303/173 |
| 6,079,800 A | | 6/2000 | Lin et al. | |
| 6,183,048 B1 | * | 2/2001 | Takahira et al. ......... | 303/113.1 |
| 6,241,326 B1 | * | 6/2001 | Ferguson et al. ........... | 303/177 |
| 6,280,003 B1 | | 8/2001 | Oshiro et al. | |
| 6,322,169 B1 | * | 11/2001 | Fennel ........................ | 303/186 |

FOREIGN PATENT DOCUMENTS

| | | |
|---|---|---|
| JP | A-5-213169 | 8/1993 |
| JP | A-9-11878 | 1/1997 |
| JP | A-10-81216 | 3/1998 |
| JP | A-10-181556 | 7/1998 |

* cited by examiner

Primary Examiner—Christopher P. Schwartz
(74) Attorney, Agent, or Firm—Oliff & Berridge, PLC

(57) ABSTRACT

A braking control apparatus for vehicles is provided with a braking control for performing such control that when deceleration d determined by a deceleration determining device is not less than a predetermined value f(v) according to vehicle speed v determined by a vehicle speed determining device, a braking force exerted on a rear wheel is limited as compared with a braking force exerted on a front wheel. This predetermined value f(v) is set so as to become smaller with increase in the vehicle speed v.

16 Claims, 6 Drawing Sheets

BRAKING CONTROL APPARATUS AND METHOD FOR VEHICLES

BACKGROUND OF THE INVENTION

1. Field of the Invention

The present invention relates to a braking control apparatus and method for vehicles and, more particularly, to the apparatus and method for controlling braking forces exerted respectively on the front wheels and on the rear wheels of an automobile.

2. Related Background Art

There are known braking controllers for controlling the braking forces distributed to the front wheels and to the rear wheels during braking. The technology disclosed in Japanese Patent Application Laid-Open No. 5-213169 is such a technique that when the deceleration reaches a predetermined value during braking, the hydraulic pressure to transmit the braking force to the rear wheels is maintained at the level at that time. The above application describes that this technique can prevent the rear wheels from locking prior to the front wheels and thus effectively prevent a sideslip of the vehicle during braking.

SUMMARY OF THE INVENTION

However, the braking force exerted on the rear wheels differs depending upon conditions of the vehicle even at fixed deceleration, and it is not always certain that the rear wheels lock. If the braking force is limited in spite of some margin of braking force left before locking of the rear wheels, the braking distance will become longer because of insufficient braking force.

In view of the above problem, an object of the present invention is to provide a braking control apparatus and method for vehicles satisfying both braking performance and stability of vehicle.

A braking control apparatus for vehicles according to the present invention comprises (1) vehicle speed determining means for determining a speed v of a vehicle, (2) deceleration determining means for determining a deceleration d of the vehicle, and (3) a braking control means for performing such control that when the deceleration d is not less than a predetermined value f(v) set according to the vehicle speed v so as to become smaller with increase in the vehicle speed, a braking force exerted on a rear wheel is limited as compared with a braking force exerted on a front wheel.

Further, a braking control method for vehicles according to the present invention comprises steps of (1) determining a speed v and a deceleration d of a vehicle, (2) determining if the deceleration d determined satisfies such a control condition that the deceleration d is not less than a predetermined value f(v) set according to the vehicle speed so as to become smaller with increase in the vehicle speed, and (3) performing such control that when said control condition is satisfied, a braking force exerted on a rear wheel is limited as compared with a braking force exerted on a front wheel.

In the apparatus and method according to the present invention, the braking force is controlled based on such control that the braking force exerted on the rear wheel is limited as compared with the braking force exerted on the front wheel when the deceleration is not less than the predetermined value according to the vehicle speed. The vehicle weight is shifted more toward the front wheel with increase in the deceleration. In the present invention, the braking force distributed to the front wheel is increased in the large deceleration region, thereby stabilizing the vehicle behavior. The predetermined value is set so as to become smaller with increase in the vehicle speed, whereby the braking-force control is carried out even at small decelerations in the high speed region where the vehicle tends to become instable, in order to keep the vehicle stable, and whereby the braking-force control is not carried out before the deceleration becomes relatively large, in the low speed region where the vehicle is relatively stable, in order to ensure the braking performance.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE PREFERRED EMBODIMENTS

Figure 1:
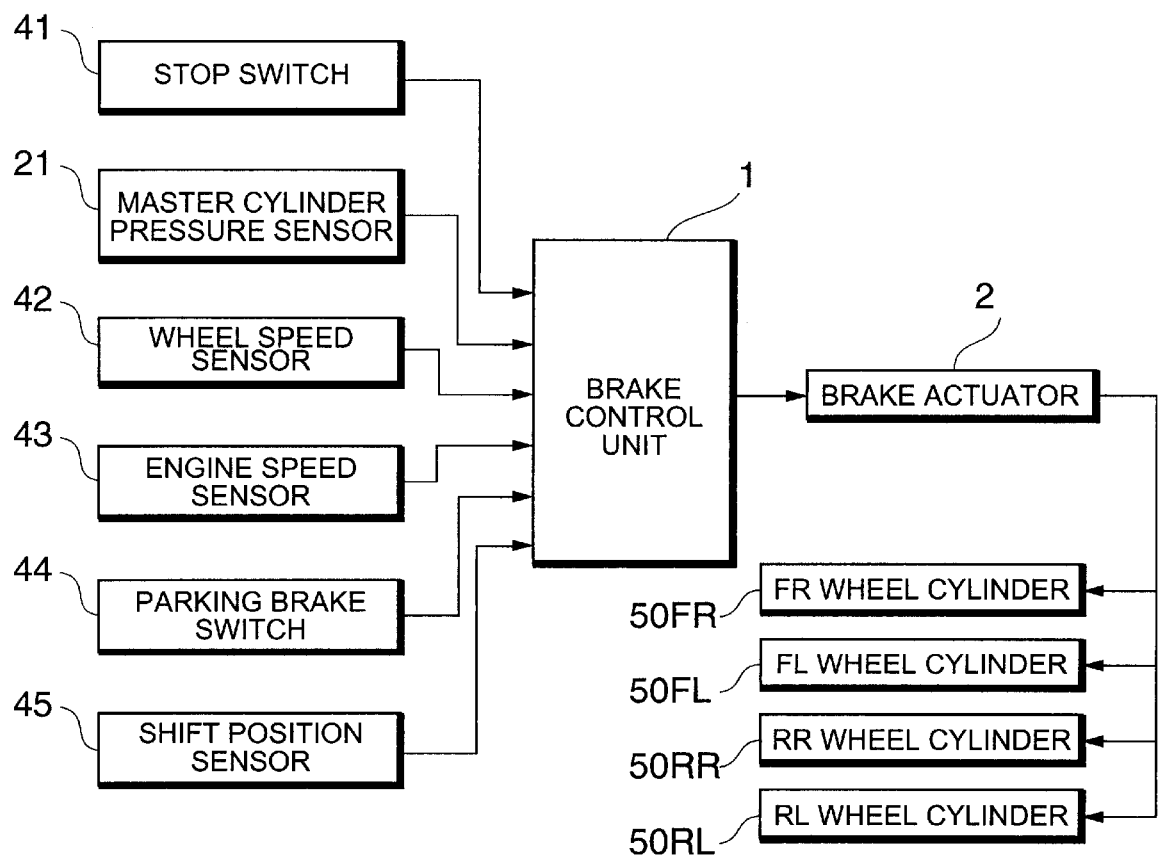
FIG. 1 is a diagram to show the structure of the braking control apparatus for vehicles of a first embodiment according to the present invention.
Figure 2:
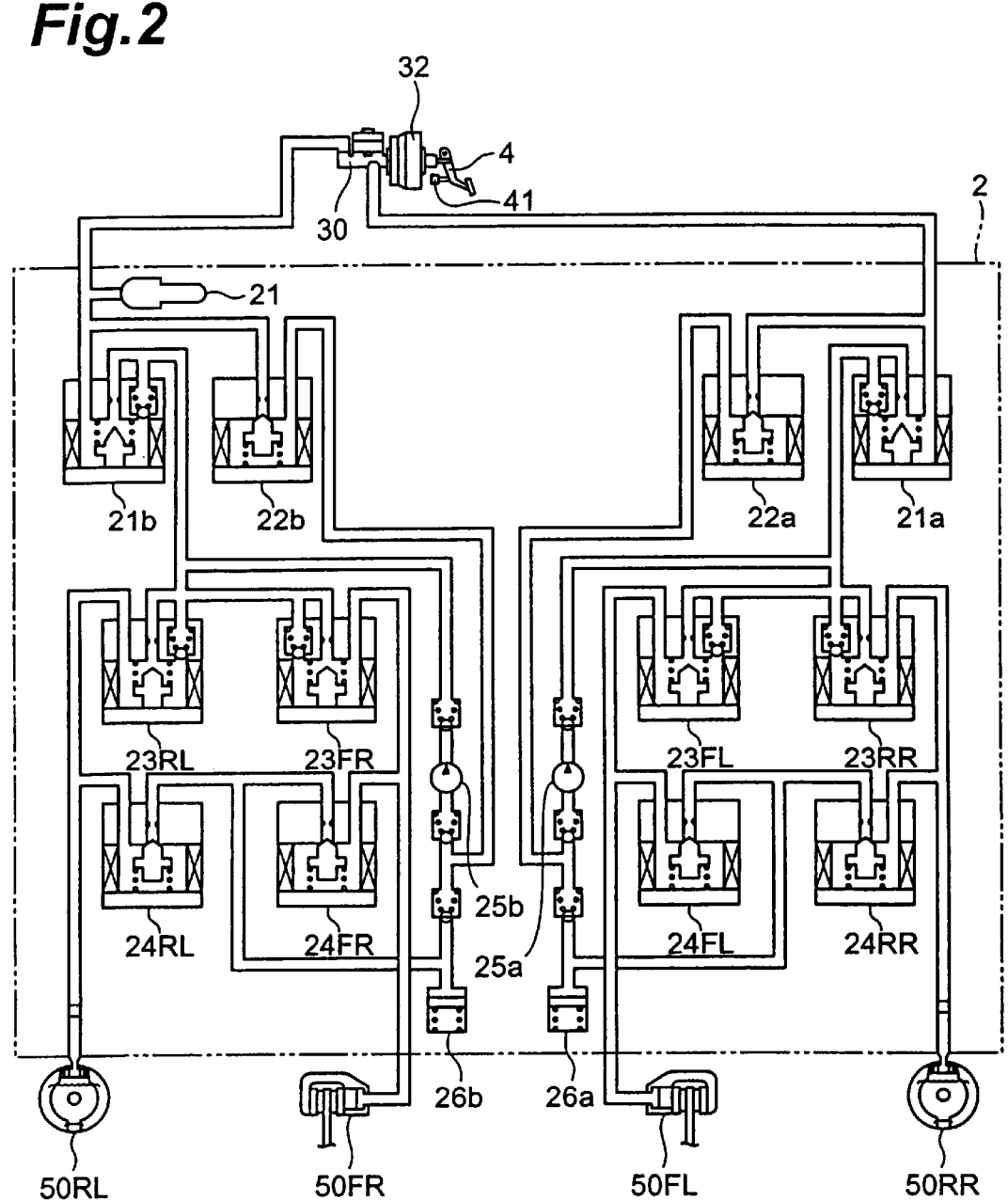
FIG. 2 is a diagram to show the structure of a braking system of a vehicle equipped with the control apparatus of FIG. 1.

A preferred embodiment of the present invention will be described hereinafter with reference to the accompanying drawings. FIG. 1 is a block diagram showing a main part of a vehicle employing a first embodiment of a braking control apparatus in accordance with the present invention. FIG. 2 is a schematic view showing the configuration of a brake actuator in the vehicle of FIG. 1.

The braking control method in accordance with the present invention is carried out by a brake control unit 1 shown in FIG. 1. Respective output signals from a stop switch 41 for detecting driver's ON/OFF operations of a brake pedal 4, a master cylinder pressure sensor 21 for detecting the hydraulic pressure of a master cylinder 30 which will be mentioned later, a wheel speed sensor 42 for detecting the wheel speed of each wheel, an engine speed sensor 43 for detecting the engine speed, a parking brake switch 44 for detecting the ON/OFF state of parking brake, and a shift position sensor 45 for detecting the shift state of the transmission are fed into the brake control unit 1. The brake control unit 1 is configured so as to carry out so-called Electronic Braking Distribution or EBD control, by controlling the brake actuator 2, for regulating the hydraulic pressures applied to wheel cylinders 50FR, 50FL, 50RR, 50RL of brakes attached to their corresponding wheels, thereby being able to independently control the respective braking forces exerted on the wheels.

As shown in FIG. 2, the brake actuator 2 is connected to the master cylinder 30, into which the stepping force of the driver exerted on the brake pedal 4 is fed after being amplified by a brake booster 32.

The brake actuator 2 has two systems having substantially the same configuration, i.e., a system connected to the front left wheel cylinder 50FL and rear right wheel cylinder 50RR, and a system connected to the front right wheel cylinder 50FR and rear left wheel cylinder 50RL; whereas the master cylinder pressure sensor 21 is connected to only one of the systems.

Each system (identified with a or b) has one piece each of master cylinder (M/C) cut solenoid valve 21 and suction solenoid valve 22, two pieces each of holding solenoid valves 23 and pressure reducing solenoid valves 24 provided so as to correspond to the respective wheel cylinders 50, and one piece each of pump 25 and reservoir 26. (The constituents provided one by one in each system are identified with a or b as with the respective system, whereas those provided so as to correspond to the wheel cylinders 50 are identified with letters FL, FR, RR, and RL which indicate the wheel positions as with the wheel cylinders 50.)

FIG. 2 shows a state where the brake actuator 2 is not operated (where the respective signals fed into the valves 21 to 24 are turned OFF). Here, the M/C solenoid valves 21 and holding solenoid valves 23 are in their open state, whereas the suction solenoid valves 22 and pressure reducing solenoid valves 24 are in their closed state, whereby a pressure identical to that at the master cylinder 30 which is amplified the stepping force applied to the brake pedal 4 by the brake booster 32 is exerted on each wheel cylinder 50.

When the brake actuator 2 is in operation, any of three kinds of control, i.e., pressure enhancing mode (including the time when no EBD control is carried out), holding mode, and pressure reducing mode, can be applied to each wheel cylinder 50. In the pressure enhancing mode, the M/C cut solenoid valve 21, holding solenoid valve 23, and pressure reducing solenoid valve 24 are kept in their OFF state, whereas the suction solenoid valve 22 is turned ON. As a consequence, the M/C cut solenoid valve 21, holding solenoid valve 23, and suction solenoid valve 22 attain their open state, whereas the pressure reducing solenoid valve 24 is in its closed state, whereby the hydraulic pressure supplied to the respective wheel cylinder 50 can be enhanced in response to the driver's braking operation. Here, the hydraulic pressure amplified by the pump 25 may be supplied to each wheel cylinder 50, so that a hydraulic pressure at the master cylinder pressure or higher can be exerted on the respective wheel cylinder 50. The pressure accumulated at the reservoir 26 can be utilized as well.

In the holding mode, the M/C cut solenoid valve 21, suction solenoid valve 22, and pressure reducing solenoid valve 24 are turned OFF, whereas the holding solenoid valve 23 is turned ON. As a consequence, the M/C cut solenoid valve 21 attains its open state, whereas the suction solenoid valve 22, holding solenoid valve 23, and pressure reducing solenoid valve 24 are in their closed state, so that the supply of hydraulic fluid to the respective wheel cylinder 50 is stopped, whereby the hydraulic pressure exerted on the respective wheel cylinder 50 is held.

In the pressure reducing mode, the M/C cut solenoid valve 21 and suction solenoid valve 22 are turned OFF, whereas the holding solenoid valve 23 and pressure reducing solenoid valve 24 are turned ON. As a consequence, the M/C cut solenoid valve 21 and pressure reducing solenoid valve 24 attain their open state, whereas the suction solenoid valve 22 and holding solenoid valve 23 are in their closed state, so that the hydraulic fluid is led from the pressure reducing solenoid valve 24 to the reservoir 26, whereby the hydraulic pressure exerted on the respective wheel cylinder 50 is reduced.

When operations of these individual valves 21 to 24 are controlled independently of each other, the respective hydraulic pressures supplied to the individual wheel cylinders 50 can be regulated independently of each other, so that each wheel cylinder 50 can be controlled so as to attain any of the pressure enhancing, holding, and pressure reducing modes, whereby the braking forces exerted on the respective wheels can be controlled independently of each other.

Figure 3:
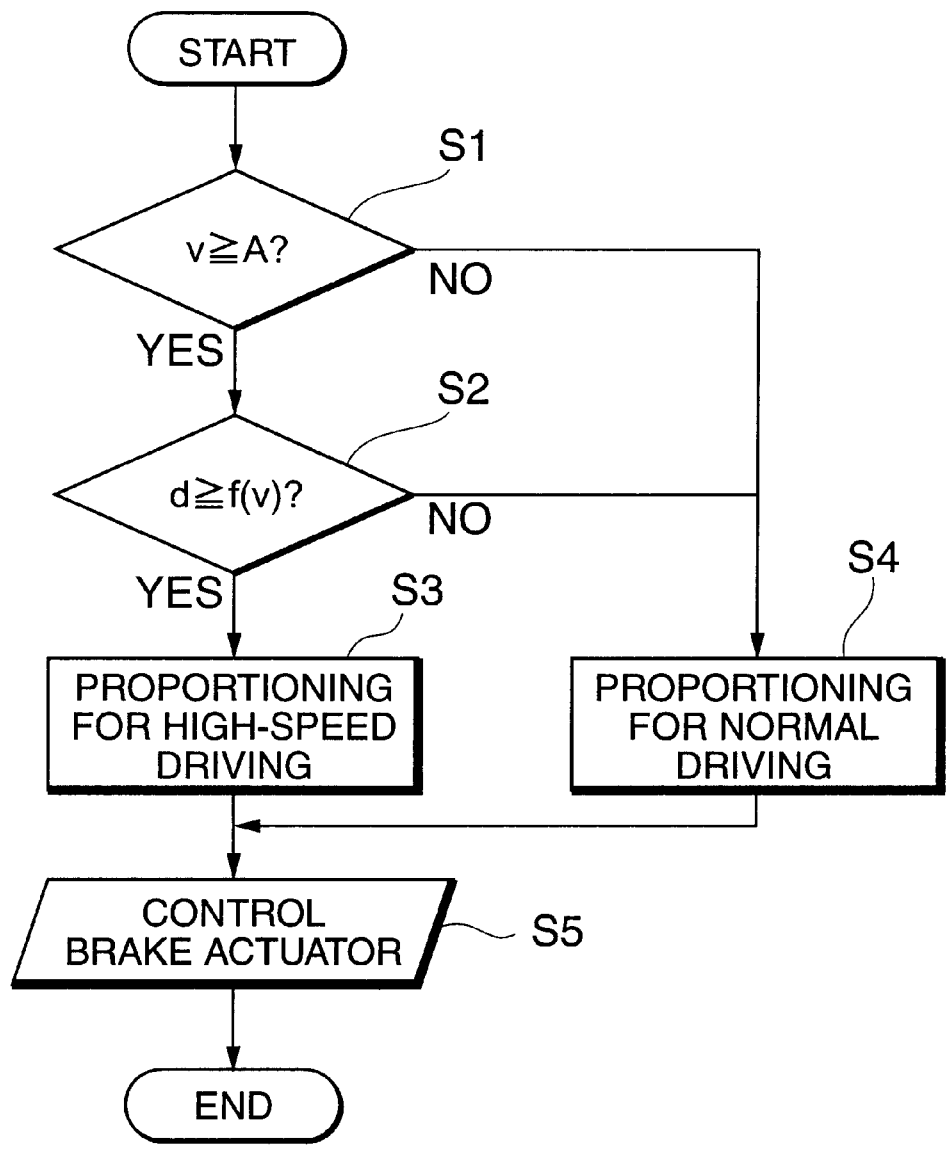
FIG. 3 is a flowchart to show proportioning control carried out by the apparatus of FIG. 1.

The braking force proportioning control for the front and rear wheels, which is the feature of the braking control in the vehicle braking control apparatus according to the present invention, will be described below with reference to FIG. 1 to FIG. 4 and FIGS. 5A to 5C. FIG. 3 is a flowchart to show this proportioning control, FIG. 4 is a diagram to illustrate a high-speed proportioning control region, and FIGS. 5A to 5C are graphs to show the temporal changes in the vehicle speed, the deceleration, and the brake pressures during the braking control carried out by the vehicle braking control apparatus according to the present invention.

Figure 5A:
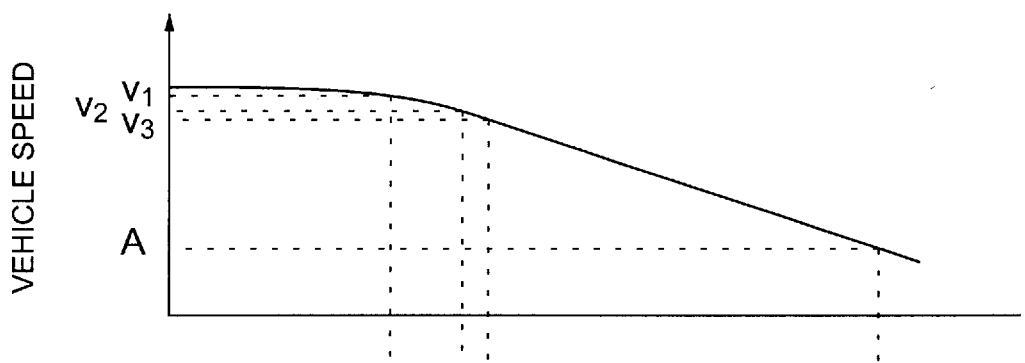
FIG. 5A to FIG. 5C are graphs to show temporal changes in the vehicle speed, the deceleration, and braking pressure, respectively, during the braking control carried out by the vehicle braking control apparatus according to the present invention.
Figure 5B:
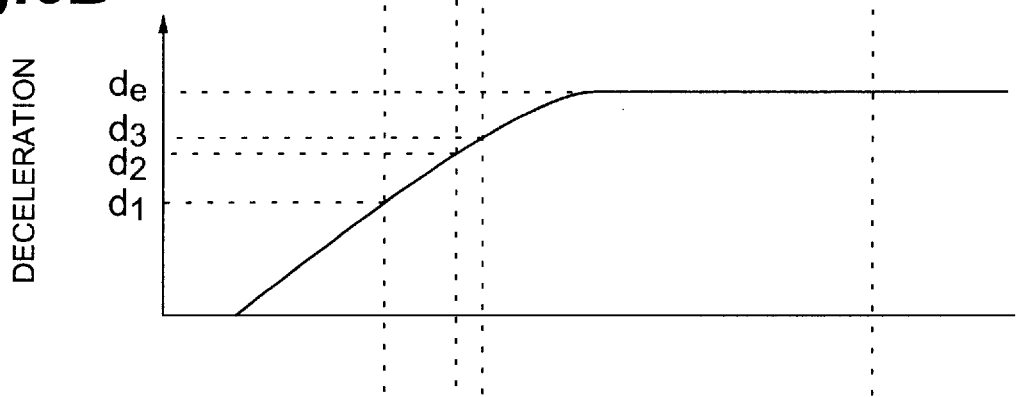
Figure 5C:
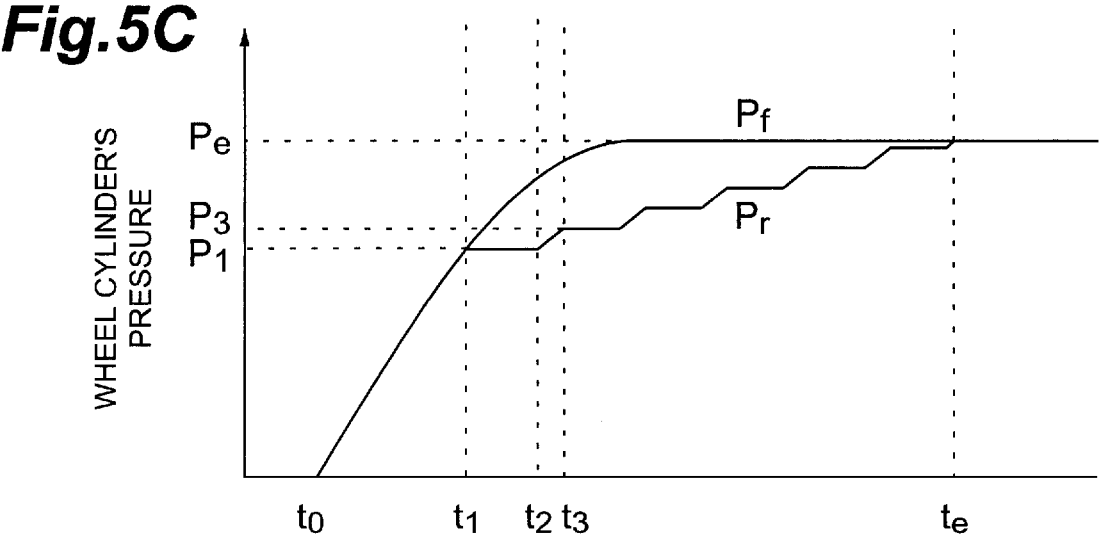

Let us suppose that the driver initiates a decelerating operation to step on the brake pedal 4 at the point of time to illustrated in FIGS. 5A to 5C. With the stepping operation on the brake pedal 4, the brake control unit 1 controls the brake actuator 2 not operated. So the all wheel cylinders 50 are directly connected to master cylinder 30. Then the hydraulic pressure Pf supplied to the wheel cylinders 50FR, 50FL of the respective front wheels FR, FL and the hydraulic pressure Pr supplied to the wheel cylinders 50RR, 50RL of the respective rear wheels RR, RL are increased each as illustrated in FIG. 5C. This increases the deceleration d as illustrated in FIG. 5B while decreasing the vehicle speed v as illustrated in FIG. 5A, thus effecting retardation of the vehicle.

The brake control unit 1 is monitoring each of the vehicle speed v and the deceleration d, based on the output signal of the wheel speed sensor 42, and, as illustrated in FIG. 3, first checks in step S1 if the vehicle speed is not less than a predetermined value A and then checks in step S2 if the deceleration d is not less than f(v), which is a function value determined by the vehicle speed. Here f(v) is a function decreasing with increase in the vehicle speed v, as illustrated in FIG. 4. This function is properly determined depending upon the type of the vehicle, etc., but a plurality of functions can be used by switching between them in accordance with a shift state measured by the shift position sensor 45 or the like. Alternately, the values of f(v) are stored in memory unit in brake control unit 1 as tabulated data (so called map). When the two conditions above are met, braking-force proportioning to the respective wheels for high-speed driving is carried out in step S3. When either of the conditions is not met, braking-force proportioning to the respective wheels for normal driving is carried out in step S4. Then the brake control unit 1 holds the brake actuator 2 not operating in step S5.

Figure 4:
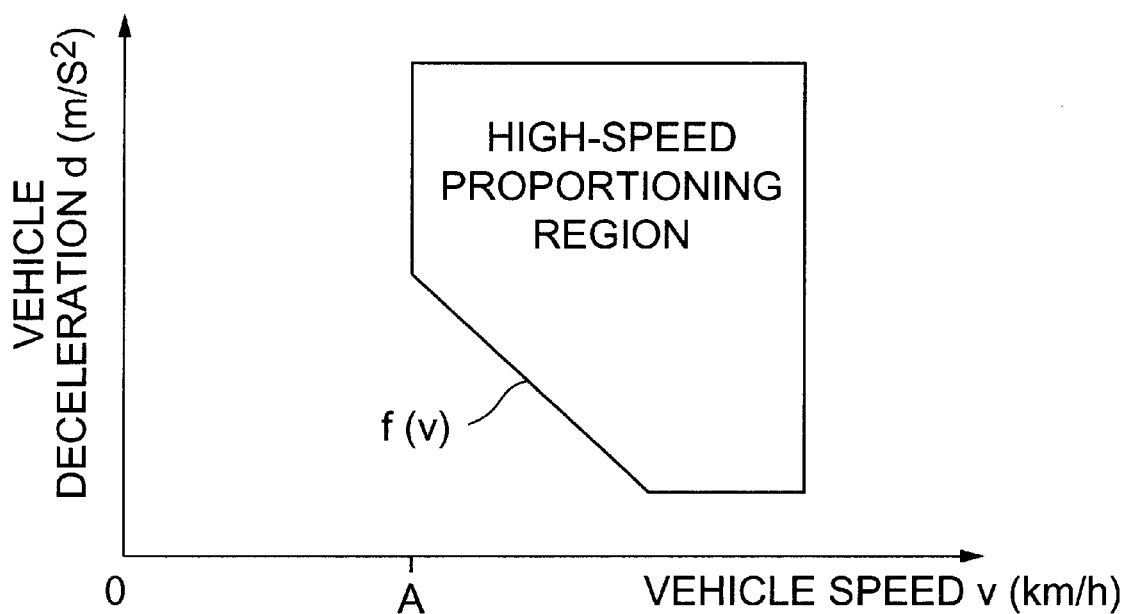
FIG. 4 is a diagram to illustrate a high-speed proportioning control region.

Specifically, let us suppose a situation in which the braking forces are enhanced with increase in the hydraulic pressures Pf, Pr supplied to the respective wheel cylinders 50, so as to increase the deceleration and in which, as a result, the deceleration d, reaches $f(v_1)$ at the point (time $t_1$) where the vehicle speed is $v_1$, which is still over A, whereby the relation between vehicle speed v and deceleration d goes into the high-speed proportioning region illustrated in FIG. 4. Then the brake control unit 1 operates brake actuator 2 as holding mode for both rear wheels so that the hydraulic pressure Pr supplied to the wheel cylinders 50RR and 50RL of the rear wheels is maintained at the hydraulic pressure $P_1$ at the point of time $t_1$. This prevents the rear wheels from locking prior to the front wheels during high-speed driving, whereby the vehicle behavior can be kept stable.

As the vehicle speed decreases with further increase in the deceleration, the deceleration $d_2$ becomes smaller than $f(v_2)$ at the point of time $t_2$ to leave the high-speed proportioning region illustrated in FIG. 4. The brake control unit 1 performs such control as to increase the hydraulic pressure Pr supplied to the wheel cylinders 50RR and 50RL of the rear wheels, from $P_1$ in order to return the proportioning control between the front and rear wheels to the normal proportioning control. So the brake actuator 2 does not operate. As the deceleration increases thereby, the deceleration $d_3$ reaches $f(v_3)$ at the point of time $t_3$ to go again into the high-speed proportioning region illustrated in FIG. 4. Therefore, the hydraulic pressure Pr supplied to the wheel cylinders 50RR and 50RL of the rear wheels is kept at the hydraulic pressure $P_3$ at the point of time $t_3$.

This operation is carried out repeatedly and only the normal proportioning control is carried out after the time $t_e$ when the vehicle speed becomes smaller than A. The lower the vehicle speed, the smaller the difference between the hydraulic pressures supplied to the wheel cylinders of the rear wheels and the front wheels; thus the sufficient braking force can be maintained.

The above embodiment was described with the control in which the hydraulic pressure Pr applied to the rear wheels underwent stepwise change with time for easier understanding of the description, but the brake control unit 1 may be structured to effect smooth change of the hydraulic pressure Pr in order to prevent passengers from feeling uncomfortable.

Figure 6:
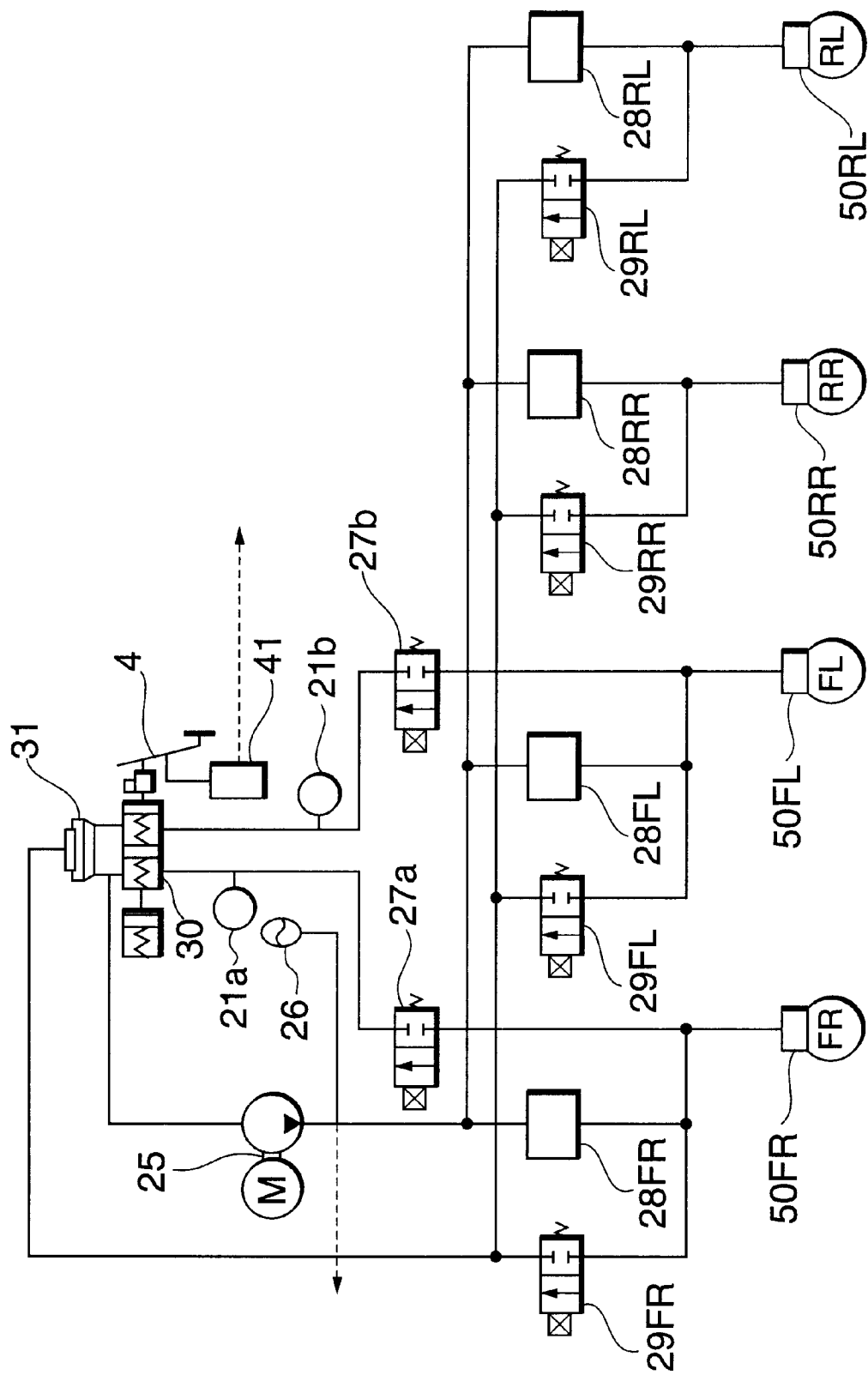
FIG. 6 is a diagram to show the structure of the braking control apparatus for vehicles of a second embodiment according to the present invention.

FIG. 6 is a diagram to show the structure of the brake actuator of second embodiment according to the present invention.

A brake pedal 4 for controlling this braking system is coupled to a piston shaft of a master cylinder 30. Each of two hydraulic lines extending from this master cylinder 30 is connected through a solenoid valve 27a or 27b to the wheel cylinder 50FR, 50FL of the front right wheel FR or the front left wheel FL, respectively. A master pressure sensor 21a (21b) is disposed in this line from the master cylinder 30 to the solenoid valve 27a (27b).

On the other hand, a hydraulic line extending from a reservoir tank 31 is connected to a pump 25, which is driven by a motor, and a hydraulic line extending from the pump 25 is connected through each linear valve 28 to the wheel cylinder 50 of each wheel. An accumulator 26 for accumulating the pressure of hydraulic fluid are placed between the pump 25 and a branch point to the linear valves 28. Each of pressure reducing valves 29 is connected to a hydraulic line returning from the wheel cylinder 50 to the reservoir tank 31.

The basic operation during braking of this braking system will be described below. When the driver steps on the brake pedal 4, the piston shaft of the master cylinder 30 is pushed to generate the hydraulic pressure (master pressure) according to a stroke amount. The solenoid valves 27 are kept in their off state during normal operation, so that the master pressure is not transmitted directly to the wheel cylinder 50FR of the front right wheel FR and to the wheel cylinder 50FL of the front left wheel FL. The pressure of the hydraulic fluid supplied from the reservoir tank 31 is increased by the pump 25 driven by the motor and this hydraulic fluid is supplied in parallel through the each linear valve 28 to the wheel cylinder 50 of the corresponding wheels. The accumulator 26 functions to maintain the hydraulic fluid at the increased pressure. This braking system can adjust the hydraulic pressures (wheel cylinder pressures) of the respective wheel cylinders 50 independently of each other by independently controlling each linear valve 28 by the braking control unit 1. The braking system can independently control the braking forces applied to the respective wheels in this way. The hydraulic fluid is returned through the pressure reducing valve 29 connected to each wheel cylinder 50, to the reservoir tank 31.

With this braking system the brake control method is fairly realized as first embodiment. Various brake systems are applicable for the present invention which can control the rear braking force independently of the front braking force.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A braking control apparatus for vehicles, which controls braking forces exerted on front and rear wheels of a vehicle respectively, the apparatus comprising:

vehicle speed determining means for determining a speed v of the vehicle;

deceleration determining means for determining a deceleration d of the vehicle; and braking control means for determining a predetermined value f(v) that is a function value determined according to said speed v of the vehicle and said predetermined value f(v) becomes smaller with increase in said speed v, the braking control means performing such control that when the deceleration d is not less than the predetermined value f(v), the braking force exerted on the rear wheels is less than the braking force exerted on the front wheels, and when the deceleration d is less than said predetermined value f(v), the braking force exerted on the rear wheel is increased.

2. A braking control apparatus according to claim 1, wherein said braking control means adjusts hydraulic pressures applied to wheel cylinders of each wheel.

3. A braking control apparatus according to claim 2, wherein said braking control means maintains the hydraulic pressure applied to the rear wheel cylinders after the deceleration d becomes larger than said predetermined value f(v).

4. A braking control apparatus according to claim 3, wherein said braking control means gradually increases the hydraulic pressure applied to the rear wheel cylinders after the deceleration d becomes smaller than said predetermined value f(v) again.

5. A braking control apparatus according to claim 1 further comprising shift state determining means for determining a shift state of the vehicle, and wherein said braking control means changes said predetermined value f(v) in response to said shift state.

6. A braking control apparatus according to claim 1, wherein said deceleration determining means determines a deceleration d based on the speed v determined by said vehicle speed determining means.

7. A braking control apparatus for vehicles, which controls braking forces exerted on front and rear wheels of a vehicle respectively, the apparatus comprising:

a vehicle speed sensor for measuring a speed v of the vehicle; and a braking control unit which determines a predetermined value f(v) that is a function value determined according to said speed v of the vehicle and said predetermined value f(v) becomes smaller with increase in said speed v, the braking control unit determines a deceleration d of the vehicle based on said speed v measured by said vehicle speed sensor and controls the braking force applied to each wheel so that when the deceleration d is not less than the predetermined value f(v), the braking force exerted on the rear wheels is less than the braking force exerted on the front wheels, and when the deceleration d is less than said predetermined value f(v), the braking force exerted on the rear wheel is increased.

8. A braking control apparatus according to claim 7 further comprises of a brake actuator to adjust hydraulic pressures applied to wheel cylinders of each wheel, and wherein said brake control unit controls the operation of said brake actuator.

9. A braking control apparatus according to claim 8, wherein said brake actuator comprises holding solenoid valves each disposed between rear wheel cylinders and braking force source, and after the deceleration d becomes larger than said predetermined value f(v) said braking control unit closes said holding solenoid valves for rear wheel cylinders to keep the hydraulic pressure applied to the rear wheel cylinders.

10. A braking control apparatus according to claim 9, wherein said braking control unit gradually opens the said holding solenoid valves for rear wheel cylinders after the deceleration d becomes smaller than said predetermined value f(v) again.

11. A braking control apparatus according to claim 7 further comprising shift state sensor for measuring a shift state of the vehicle, and wherein said breaking control unit changes said predetermined value f(v) in response to said state.

12. A braking control method for vehicles, which controls braking forces exerted on front and rear wheels of a vehicle respectively, the method comprising steps of:

determining a speed v and a deceleration d of the vehicle;

determining a predetermined value f(v) that is a function value determined according to said speed v of the vehicle and said predetermined value f(v) becomes smaller with increase in said speed v;

determining if the deceleration d determined satisfies such a control condition that the deceleration d is not less than the predetermined value f(v); and performing such control that when said control condition is satisfied, the braking force exerted on the rear wheels is less than the braking force exerted on the front wheels, and when the deceleration d is less than said predetermined value f(v), the braking force exerted on the rear wheel is increased.

13. A braking control method according to claim 12, wherein said control is adjusting hydraulic pressures applied to wheel cylinders of each wheel.

14. A braking control method according to claim 13, wherein said control is involved maintaining the hydraulic pressure applied to the rear wheel cylinders after the deceleration d becomes larger than said predetermined value f(v).

15. A braking control method according to claim 14, wherein said control is involved gradually increasing the hydraulic pressure applied to the rear wheel cylinders after the deceleration d becomes smaller than said predetermined value f(v) again.

16. A braking control method according to claim 12 further comprising determining a shift state of the vehicle, and wherein said control is involved changing said predetermined value f(v) in response to said shift state.

* * * * *